(12) United States Patent
Kamata

(10) Patent No.: US 8,139,439 B2
(45) Date of Patent: Mar. 20, 2012

(54) METHODS AND SYSTEMS FOR SEISMIC SENSOR CALIBRATION

(75) Inventor: Masahiro Kamata, Kawasaki (JP)

(73) Assignee: Schlumberger Technology Corporation, Sugar Land, TX (US)

( * ) Notice: Subject to any disclaimer, the term of this patent is extended or adjusted under 35 U.S.C. 154(b) by 308 days.

(21) Appl. No.: 12/545,076

(22) Filed: Aug. 21, 2009

(65) Prior Publication Data

US 2010/0232258 A1    Sep. 16, 2010

Related U.S. Application Data

(60) Provisional application No. 61/159,416, filed on Mar. 11, 2009.

(51) Int. Cl.
*H04B 17/00* (2006.01)
(52) U.S. Cl. .......................................................... 367/13
(58) Field of Classification Search ...................... 367/13
See application file for complete search history.

(56) References Cited

U.S. PATENT DOCUMENTS

| | | | |
|---|---|---|---|
| 3,878,504 A * | 4/1975 | Sears | 367/187 |
| 4,757,706 A | 7/1988 | Doggett | |
| 5,113,375 A | 5/1992 | Jones, Jr. | |
| 5,774,415 A * | 6/1998 | Hall et al. | 367/13 |
| 5,856,638 A * | 1/1999 | Burkhard et al. | 177/210 EM |
| 7,395,163 B1 * | 7/2008 | Morrison et al. | 702/75 |
| 2003/0039325 A1 * | 2/2003 | Watanabe | 375/346 |
| 2005/0068851 A1 | 3/2005 | Schleisiek et al. | |

FOREIGN PATENT DOCUMENTS

WO    03/096071    11/2003

OTHER PUBLICATIONS

Asten, M.W.; "Theory and Practice of Geophone Calibration In Situ Using a Modified Step Method," Geoscience Electronics, IEEE Transactions on, vol. 15, No. 4, pp. 208-214, Oct. 1977.*
Gordon B. Bowden, "Calibration of Geophone Microseismic Sensors", LCLS-TN-03-6, Oct. 2003, pp. 1-9.
M. Kamata, et al. "Improving sensor technology brings new level of reservoir understanding", SEG Las Vegas 2008 Annual Meeting, 2008, XP002586190, pp. 168-172.

* cited by examiner

*Primary Examiner* — Thomas Tarcza
*Assistant Examiner* — James Hulka
(74) *Attorney, Agent, or Firm* — Jianguang Du; Jody DeStefanis; Jeff Griffin

(57) ABSTRACT

Methods and systems for calibrating seismic sensors configured or designed for use in seismic signal detection. According to certain embodiments of the present disclosure, a current is injected into a moving coil of a seismic sensor and a voltage is measured across the moving coil. The moving coil is locked by the injected current such that environmental noise is reduced while measuring the moving coil voltage.

12 Claims, 15 Drawing Sheets

FIG. 5
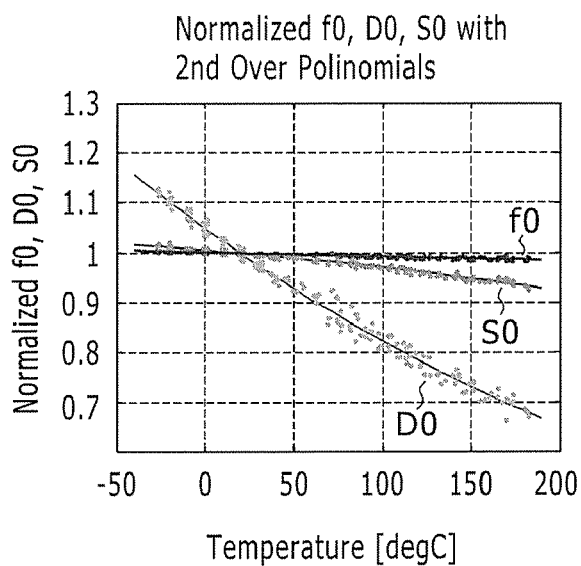 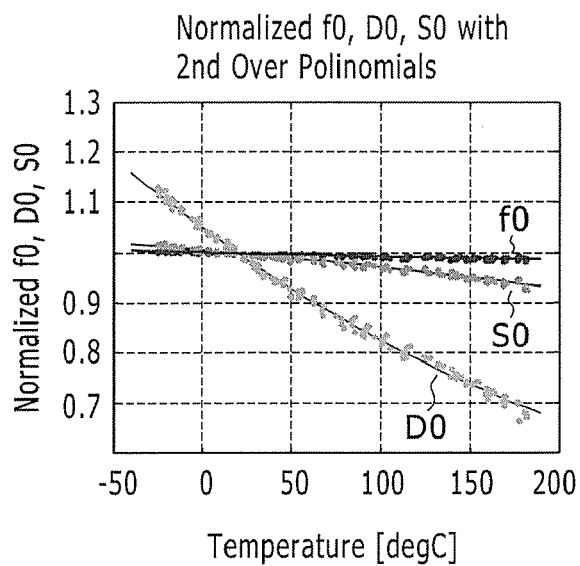
FIG. 6
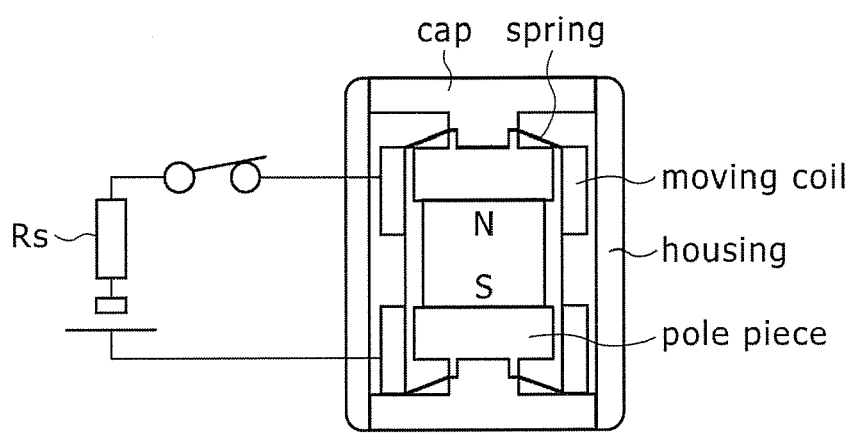

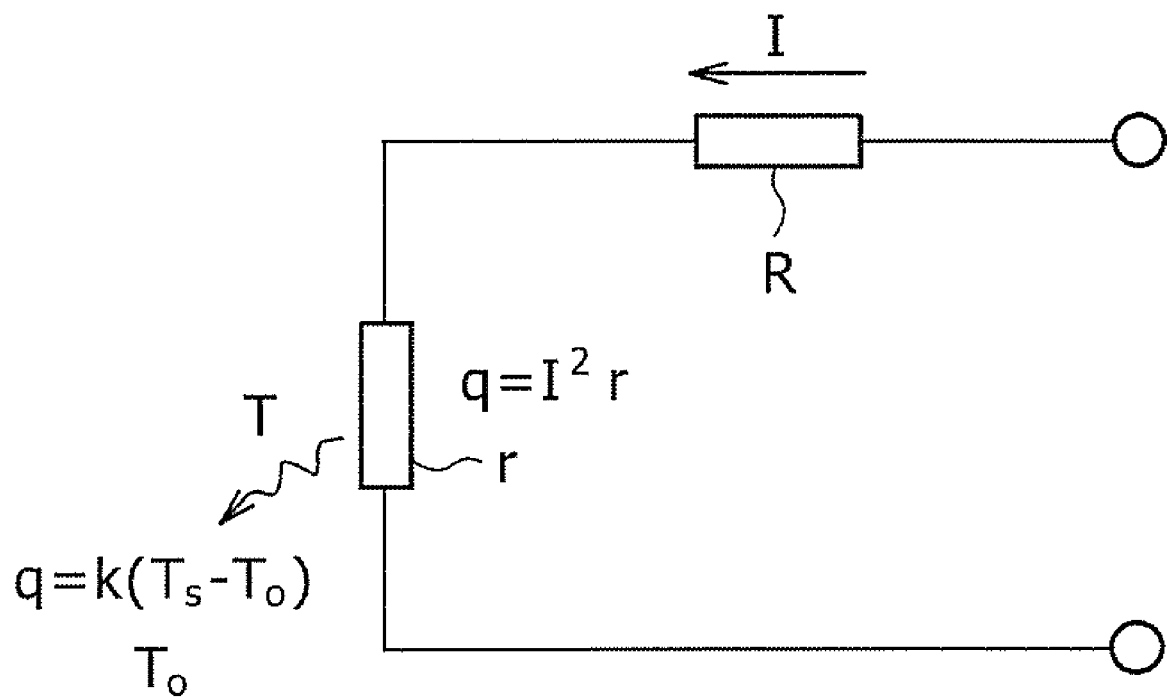

Fc=5Hz, 2nd order

FIG.12
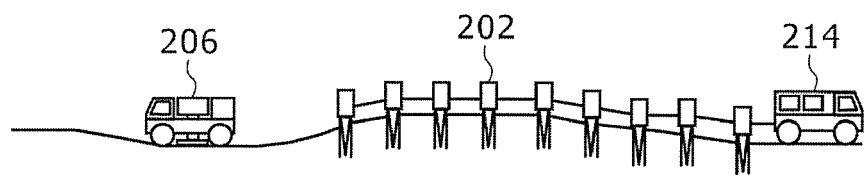
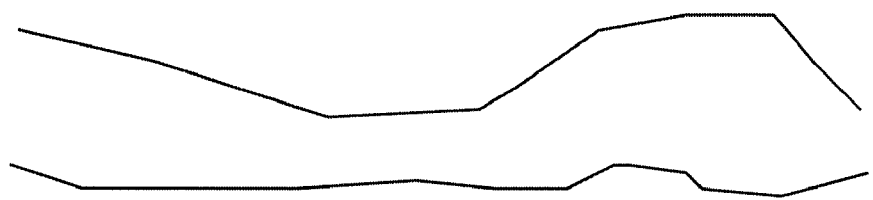
FIG.13
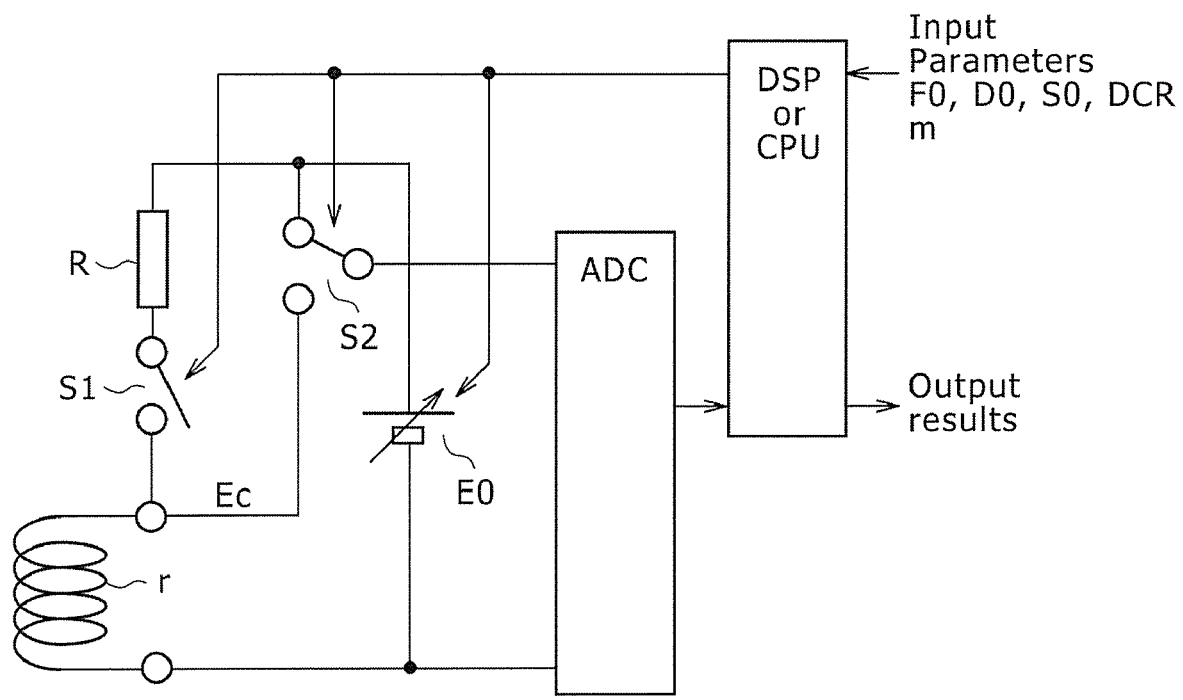

METHODS AND SYSTEMS FOR SEISMIC SENSOR CALIBRATION

RELATED APPLICATIONS

This application claims priority of U.S. Provisional Patent Application Ser. No. 61/159,416, filed 11 Mar. 2009 the entire contents of which are incorporated herein by reference for all purposes.

BACKGROUND

The present disclosure relates to techniques for taking accurate seismic measurements and, more particularly, to calibrating and eliminating noise in a seismic sensor by applying a specified amount of current to the moving coil of the seismic sensor.

The techniques presented herein relate to devices for sensing vibrations in earth formations such as electrodynamic sensing devices, including geophones and seismometers that have a moving coil placed in a magnetic field in a centered position. The present disclosure may be applicable to other types of vibration transducers, either in sensing or transmitting operation.

Seismic measurements and/or monitoring detect the vibrations in the earth resulting from a source of seismic energy that are sensed at discrete locations by sensors. In some applications, the output of the sensors is used to determine the structure of the underground formations. The source of seismic energy can be natural, such as earthquakes and other tectonic activity, subsidence, volcanic activity or the like, or man-made such as acoustic signals from surface or underground operations, or from deliberate operation of seismic sources at the surface or underground. For example, the sensed seismic signals may be direct signals that are derived from micro-seismicity induced by fracturing or reservoir collapse or alteration, or reflected signals that are derived from an artificial source of energy.

Sensors fall into two main categories; hydrophones which sense the pressure field resulting from a seismic source, or geophones which sense particle motion arising from a seismic source.

When the earth moves due to the seismic energy propagating either directly from the source or via an underground reflector, the geophone, which can be located at the earth's surface or on the wall of a borehole which penetrates the earth, moves in the direction of propagation of the energy (in the example of P-waves). If the axis of the geophone is aligned with the direction of motion, however, the moving coils mounted on springs inside the geophone stay in the same position causing relative motion of the coils with respect to the housing. When the coils move in the magnetic field, a voltage is induced in the coils which can be output as a signal. The response of a geophone is frequency dependent.

In order to ensure proper working operation of a geophone, typically the geophone is calibrated at the factory, periodically after manufacture and/or before each use. In this, geophone manufacturers and vendors generally do not perform any calibrations on their geophone units before the units are sold to customers. Rather the manufacturers provide assurances that the response of the geophone units are within specified tolerance ranges at a specific temperature such as room temperature. However, such tolerance guarantees are not a substitute for proper calibration of the geophone units. Consequently, many purchasers of geophone units perform their own calibration tests on the purchased geophone units before deploying such units in the field or during field use.

However, conventional geophone calibration tests are often inadequate for assuring the desired precision of the geophone measurements typically demanded for many of today's seismic measurement activities. In certain calibration techniques to measure the DC resistance (DCR) of the moving coil, current is injected into the coil and the resistance is determined from the voltage that appears across the coil. However, since the moving coil is also sensitive to vibrations of the geophone the DCR measurement accuracy depends on the environmental noise. If the geophone sensitivity is high, the measured noise is large and the accuracy of the DCR measurement is degraded. Furthermore, the inaccuracy of the DCR value influences other seismic sensor parameters, such as sensitivity and damping factor, since DCR is a basic value for calculating geophone parameters.

Accordingly, it will be appreciated that there exists a desire to improve upon conventional geophone calibration techniques in order to improve the accuracy of seismic measurements.

The limitations of conventional seismic sensors noted in the preceding are not intended to be exhaustive but rather are among many which may reduce the effectiveness of previously known sensor calibration techniques. The above should be sufficient, however, to demonstrate that seismic sensor techniques existing in the past will admit to worthwhile improvement.

SUMMARY OF THE DISCLOSURE

Embodiments disclosed herein provide methods and systems for seismic sensors, such as geophones and seismometers. The principles of the present disclosure are directed to techniques for correcting errors in DCR measurements due to environmental noise such as ambient vibratory noise, errors due to internal circuits such as DC offset and DC drift, external errors due to Peltier effects and electrical signal noise, and errors due to the system such as heat generation in the measurement circuit. In particular, some embodiments of the present disclosure provide methods and systems for calibrating seismic sensors in which the DCR measurements are improved and errors due to environmental noise are reduced. Other embodiments herein are directed to compensating for heat generation effects on the DCR. Further embodiments of the present disclosure provide systems for calibrating seismic sensors including one or more digital signal processor. Yet further embodiments are directed to techniques for suppressing electrical mains noise in the measured voltage data by averaging the measured data over cycles of the noise frequency.

Usually the DCR of a seismic sensor moving coil is measured by using a multimeter, ohm meter or resistance meter. Such a measurement instrument injects a current to a resistive component and reads the voltage across the component. The instrument displays or outputs the amount of the resistance relating to the voltage and current. However, since the amount of injected current depends on a measurement instrument the user does not know how much current is injected. In the case of a geophone coil resistance, the moving coil is partially levitated by the injected current by an unknown amount, and the moving coil also responds to vibratory ambient noise. If the measurement time to average the data is not long enough compared to the period of the ambient noise, the measurement is not repeatable. For example, if the natural frequency is 1 Hz, a measurement time of 0.5 second is not enough to average ambient noise at about 1 Hz.

Measurement electronics may have DC offset or DC drift to cause errors in determining DCR. Often one measurement instrument shows a different resistance value from another measurement instrument. The cause may partially be due to inaccuracy of the measurement instruments, but often can also be due to external factors, such as the difference in the Peltier effects, some electrification effects, i.e., diode effects, especially due to metal corrosion. Therefore, resistance measurements often change from time to time depending on such external factors.

The applicant recognized that by applying a predetermined current to a seismic sensor the moving coil of the seismic sensor could be locked so that undesirable noise due to vibrations in the environment surrounding the sensor could be minimized or eliminated. The applicant further recognized that current injected to lock the moving coil might generate heat and such heat generation could influence the DCR. Applicant further recognized that it is desirable that such heat generation be compensated based on the desired accuracy in DCR measurements. The applicant also recognized that electrical noise might be prevalent in the electrical signals that are measured and should be suppressed to eliminate errors in the measurements.

In some embodiments of the present disclosure, a method of calibrating a seismic sensor comprises injecting a current into a moving coil of the seismic sensor; measuring a voltage across the moving coil; and locking the coil such that environmental noise is reduced while measuring the moving coil voltage. In one possible embodiment of the present disclosure DCR of the moving coil is determined. In certain aspects herein, the method includes compensating for heat generated by the current injected into the moving coil of the seismic sensor by continuously measuring changes in DCR over time.

The present disclosure in some embodiments provides for cancelling one or more of Peltier effects, DC offset, and DC drift by injecting different currents to the moving coil of the seismic sensor. The polarity of the current may be flipped and the current having flipped polarity injected into the moving coil of the seismic sensor.

In certain aspects herein, a method of measuring DCR of a seismic sensor comprises injecting a first current into a moving coil of the seismic sensor; measuring a first voltage across the moving coil; injecting a second current into the moving coil, wherein the second current is different from the first current; measuring a second voltage across the moving coil; immobilizing the moving coil such that environmental noise is reduced while measuring the first and second moving coil voltages; and determining DCR of the moving coil based on the first voltage and the second voltage across the moving coil.

In certain embodiments of the present disclosure, DCR of the moving coil is determined by $$r = \frac{R}{\frac{E_{02} - E_{01}}{E_{c2} - E_{c1}} - 1},$$

where r is the DCR of the moving coil; R is the series resistance; and $E_{01}$ and $E_{02}$ are supply voltages and $E_{c1}$ and $E_{c2}$ are moving coil voltages at different amounts of current, $I_1$ and $I_2$, respectively. In other aspects of the present disclosure, the method includes injecting a second, different current into the moving coil of the seismic sensor; measuring a second voltage across the moving coil; and determining DCR of the moving coil.

In some embodiments of the present disclosure, a system for calibrating a seismic sensor comprises an electrical source for applying a voltage across a moving coil of a seismic sensor; a measurement device for measuring a voltage across the moving coil; a digital signal processor in communication with the seismic sensor; and a set of instructions executable by the processor that, when executed, applies the voltage to the seismic sensor and determines if the moving coil has been locked, wherein the system is configured or designed to reduce environmental noise while measuring the moving coil voltage. The system may further comprise an interface communicably coupled to the measurement device for displaying the voltage across the coil after the coil has been locked.

In yet other aspects of the present disclosure, a method of calibrating a seismic sensor comprises injecting a current into a moving coil of the seismic sensor; measuring a voltage across the moving coil; and suppressing electrical mains noise in the measured voltage data by averaging the measured data over cycles of the noise frequency. In certain embodiments of the present disclosure, the measured data are averaged over n cycles of the noise frequency, where n is an integer number. In other embodiments, the electrical mains noise comprises 50 Hz or 60 Hz electrical mains noise; and the measured data is averaged over 100 ms cycles, or any multiples of 100 ms.

Additional advantages and novel features will be set forth in the description which follows or may be learned by those skilled in the art through reading the materials herein or practicing the principles described herein. Some of the advantages described herein may be achieved through the means recited in the attached claims.

THE DRAWINGS

The accompanying drawings illustrate certain embodiments and are a part of the specification. Together with the following description, the drawings demonstrate and explain some of the principles of the present invention.

FIG. 5 shows graphs depicting geophone response parameters, natural frequency $f_0$, open circuit damping $D_0$ and open circuit sensitivity $S_0$ as functions of temperature;

FIG. 6 is schematic drawing of a geophone along with one embodiment of a circuit diagram according to the principles of the present disclosure;

FIG. 9 is a block diagram representation of heat dissipation by current injection and heat convection from the moving coil of a seismic sensor to ambient temperature;

FIG. 12 shows an application in land seismic operation for calibrating seismic sensors deployed on ground surface;

FIG. 13 shows a system block diagram according to the present disclosure; and

Figure 14A:
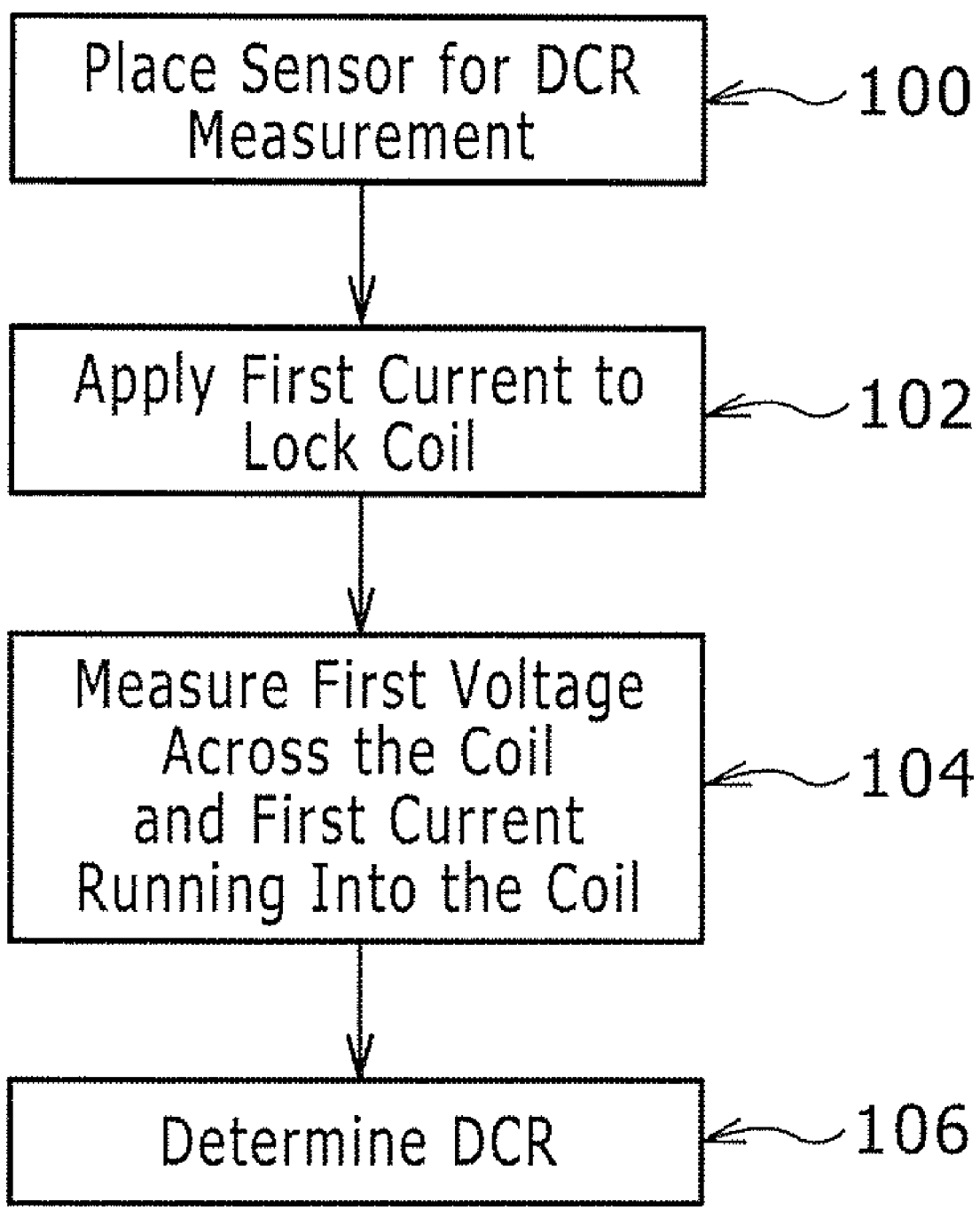
Figure 14B:
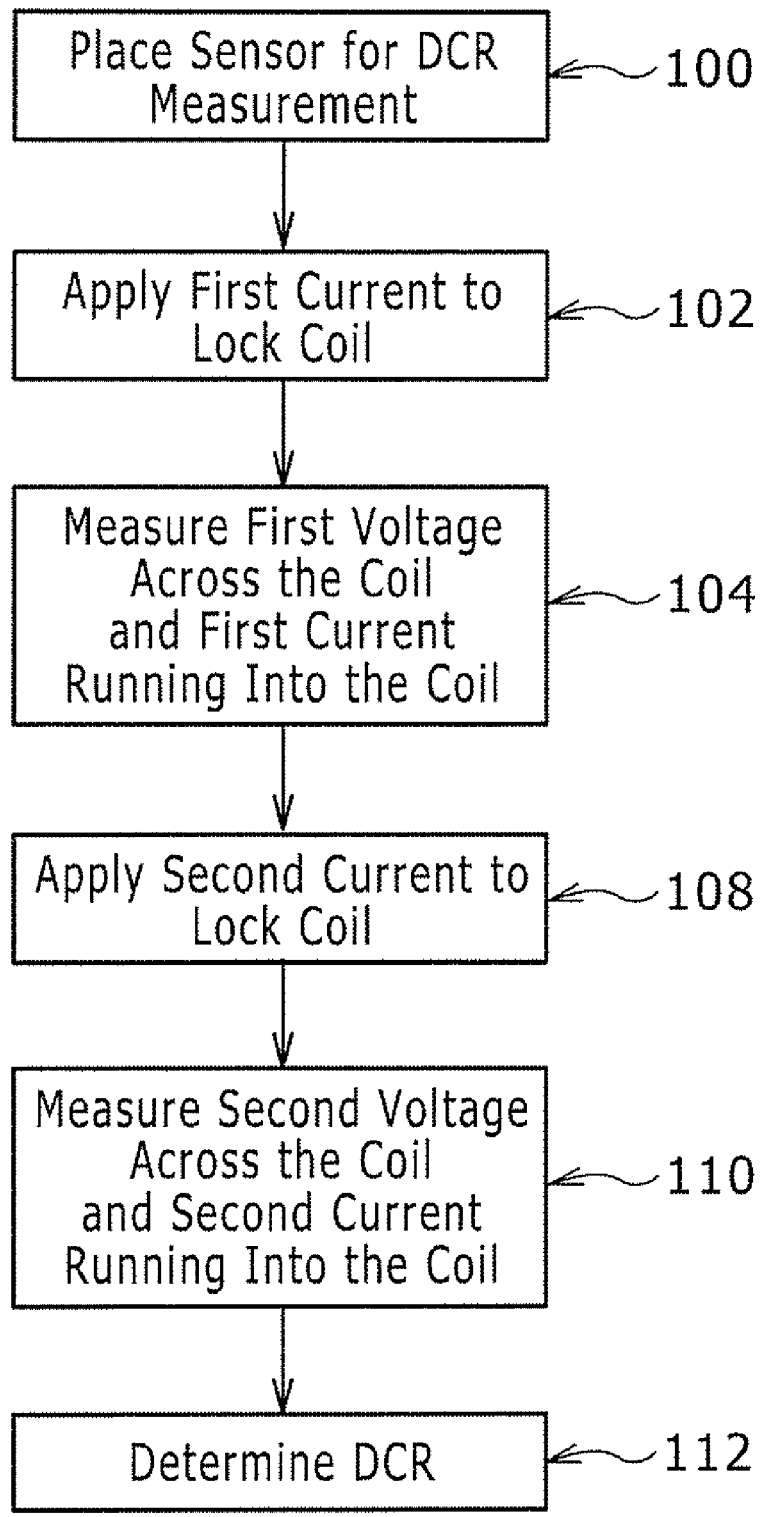
Figure 14C:
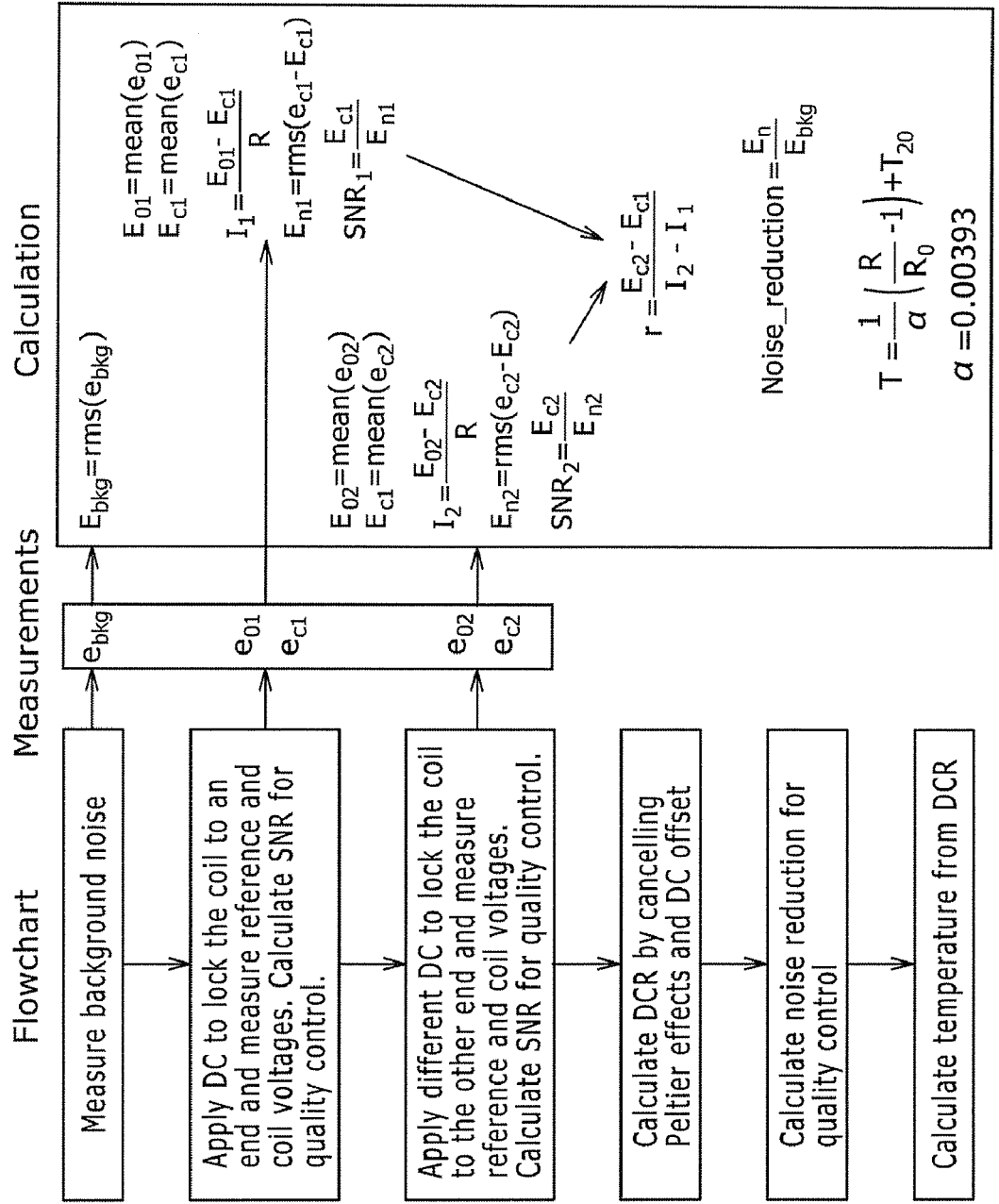

FIGS. 14A-C show flowcharts of some possible techniques for calibrating seismic sensors according to the present disclosure.

Throughout the drawings, identical reference numbers and descriptions indicate similar, but not necessarily identical elements. While the principles described herein are susceptible to various modifications and alternative forms, specific embodiments have been shown by way of example in the drawings and will be described in detail herein. However, it should be understood that the invention is not intended to be limited to the particular forms disclosed. Rather, the invention includes all modifications, equivalents and alternatives falling within the scope of the appended claims.

DETAILED DESCRIPTION

Illustrative embodiments and aspects of the invention are described below. It will of course be appreciated that in the development of any such actual embodiment, numerous implementation-specific decisions must be made to achieve the developers' specific goals, such as compliance with system-related and business-related constraints, that will vary from one implementation to another. Moreover, it will be appreciated that such development effort might be complex and time-consuming, but would nevertheless be a routine undertaking for those of ordinary skill in the art having the benefit of this disclosure.

Reference throughout the specification to "one embodiment," "an embodiment," "some embodiments," "one aspect," "an aspect," or "some aspects" means that a particular feature, structure, method, or characteristic described in connection with the embodiment or aspect is included in at least one embodiment of the present invention. Thus, the appearance of the phrases "in one embodiment" or "in an embodiment" or "in some embodiments" in various places throughout the specification are not necessarily all referring to the same embodiment. Furthermore, the particular features, structures, methods, or characteristics may be combined in any suitable manner in one or more embodiments. The words "including" and "having" shall have the same meaning as the word "comprising."

Moreover, inventive aspects lie in less than all features of a single disclosed embodiment. Thus, the claims following the Detailed Description are hereby expressly incorporated into this Detailed Description, with each claim standing on its own as a separate embodiment of this invention.

Turning now to the drawings, wherein like numerals indicate like parts, the disclosure herein is directed to the concept of various techniques that may be utilized to facilitate and improve seismic signal detection. The present disclosure contemplates applicability of the disclosed techniques to electrodynamic type sensors, such as a geophone or a seismometer, that are utilized in the field of seismic prospecting, or of active or passive monitoring of underground reservoirs. As used in this application, the term "geophone" is intended to include conventional-type geophones such as that illustrated in FIG. 1, and very low frequency geophones such as seismometer type electrodynamic sensors, as well as geophone accelerometer (GAC) sensors from Schlumberger Corporation which, for example, may be configured or designed to measure relatively wider acceleration ranges than conventional-type geophones.

The sensors may be deployed in exploration and/or production wells that are deviated in relation to the vertical direction, and comprise multi-component geophones for detecting components of signals that are received along three orthogonal axes. In aspects according to the present disclosure, the seismic sensors may be utilized in wireline, land seismic, seabed seismic, permanent or other monitoring, hydro-fracture monitoring, production logging, among others, including systems for earthquake monitoring, long term monitoring for water and $CO_2$ reservoirs, nuclear test monitoring, and such like activity that require the accurate and efficient acquisition of seismic data.

Some principles of the present disclosure are also described in co-pending, commonly owned, U.S. patent application Ser. No. 12/365,889, entitled "Methods and Systems for Temperature Compensated Temperature Measurements", the entire contents of which are hereby incorporated herein by reference.

As described in greater detail below, the present disclosure provides various techniques which may be used to facilitate and improve seismic signal detection by reducing or eliminating the effects of noise that is prevalent in the environment during seismic sensor calibration, i.e., environmental noise that tends to distort or skew the determined parameter values such as DCR of a moving coil seismic sensor. The techniques disclosed herein may be used for factory testing and calibration during or after manufacture of the seismic sensors, in a laboratory or testing facility, in the field, and/or after deployment of the seismic sensors.

The present disclosure proposes techniques in which environmental noise effects are reduced or eliminated in seismic signal measurements by locking the moving coil of the seismic sensor through the injection of a suitable amount of current. Further, the present disclosure proposes techniques that compensate for heating effects that could be caused due to the injection of current to the moving coil. In addition, the present disclosure addresses other external factors such as Peltier effects, DC drift and/or DC offset that might introduce errors in seismic signal measurements. Techniques for suppressing electrical noise are discussed in the present disclosure.

In order to gain a better understanding of the various techniques and features described in this application, a brief description of geophone measurement techniques will now be provided. In a seismic survey, seismic waves that propagate through the earth are measured to map structural images in the earth. Geophones are often used to detect seismic signals at various locations, such as, for example, downhole, at ground surface and/or at the seabed. An example of a conventional geophone is shown in FIG. 1.

Figure 1:
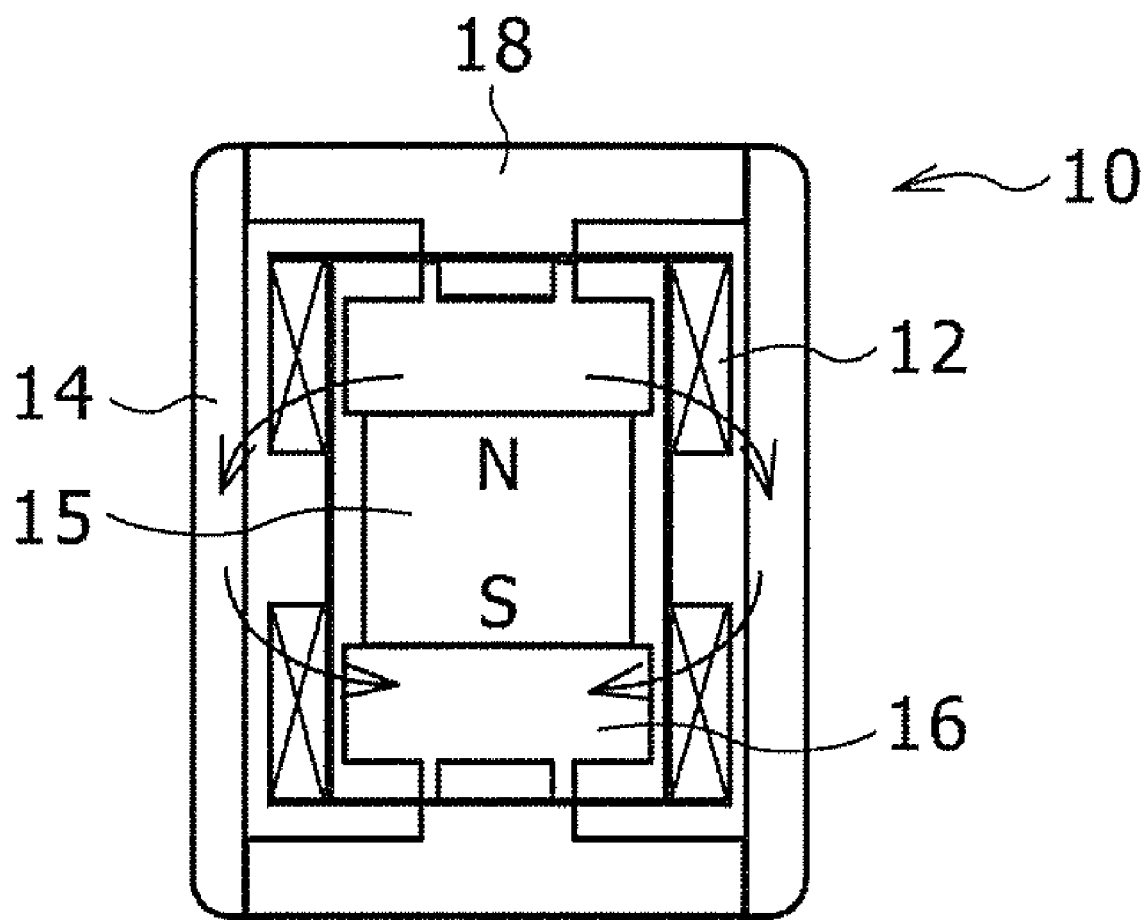
FIG. 1 is a schematic view of a conventional geophone seismic sensor.

The geophone 10 of FIG. 1 includes a moving coil 12 mounted on a bobbin, a magnet 15, a pair of pole pieces 16 with suspension springs 20 and a housing 14. The pole pieces 16 and housing 14 are made of magnetically permeable material and form a magnetic field in which the moving coil 12 is suspended. In the example of FIG. 1, the moving coil 12 mounted on a bobbin and suspension springs 20 collectively form the effective moving mass portion m of the geophone.

The moving coil 12 is suspended in a magnetic field by means of the pair of springs 20, as shown in FIG. 1. The springs are designed to control radial movement of the coil and to provide a desired natural frequency for the mass-spring system. The moving coil tries to stay in the same position while the housing of the geophone is moved in response to external vibrations. The motion of the moving coil relative to the housing (with a magnetic flux field) causes the coil to generate electric signals that are proportional to the velocity of the moving coil relative to the housing where the magnet is attached.

Figure 2A:
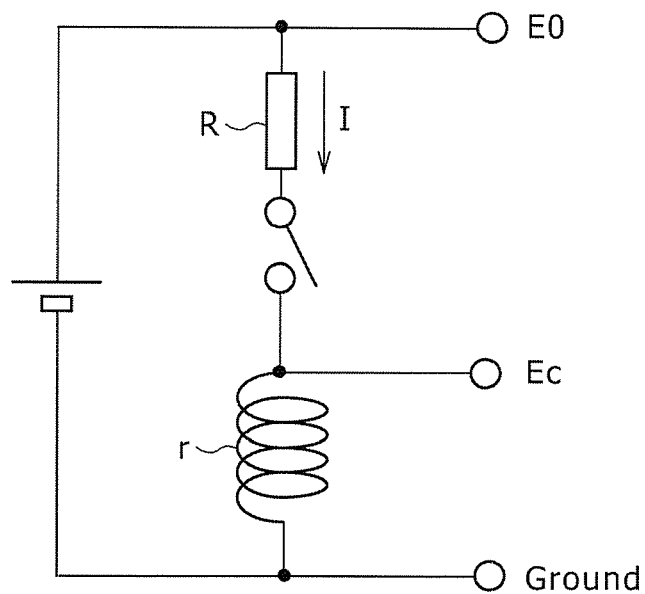
FIG. 2A is a schematic view of a circuit involved in conventional geophone DCR measurements and step tests.

As previously mentioned, geophone calibration includes measurements of the DCR of the moving coil of the sensor. As shown in FIG. 2A, a DC voltage is applied to the coil through a resistance and a voltage across the coil is measured. In this exemplary embodiment, $E_0$ is the supply voltage, $E_c$ is coil voltage, R is the series resistance, and r is the DCR of the coil.

Figure 2B:
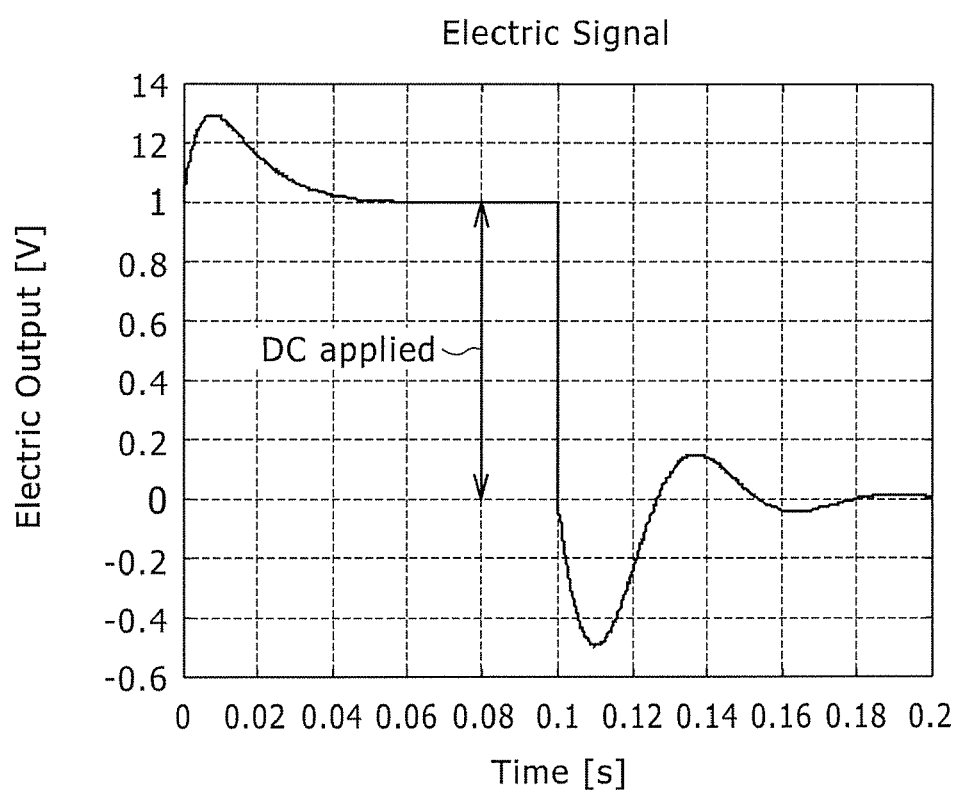
FIG. 2B is graphic representation of a step response of a geophone responding to a step signal input in a geophone step test.

When a DC voltage is applied across the coil, the coil is lifted and the coil experiences natural oscillation. The duration or time of the natural oscillation can be minimized by adjusting R so that the natural oscillation is critically damped, as is shown in FIG. 2B.

The geophone response parameters are calibrated from the natural oscillation of the coil after the DC is removed. From the zero crossing, the natural frequency is calculated and from the decay of the oscillation the damping is calculated. The sensitivity is calculated from the initial voltage applied and amplitude of the response.

Figure 3:
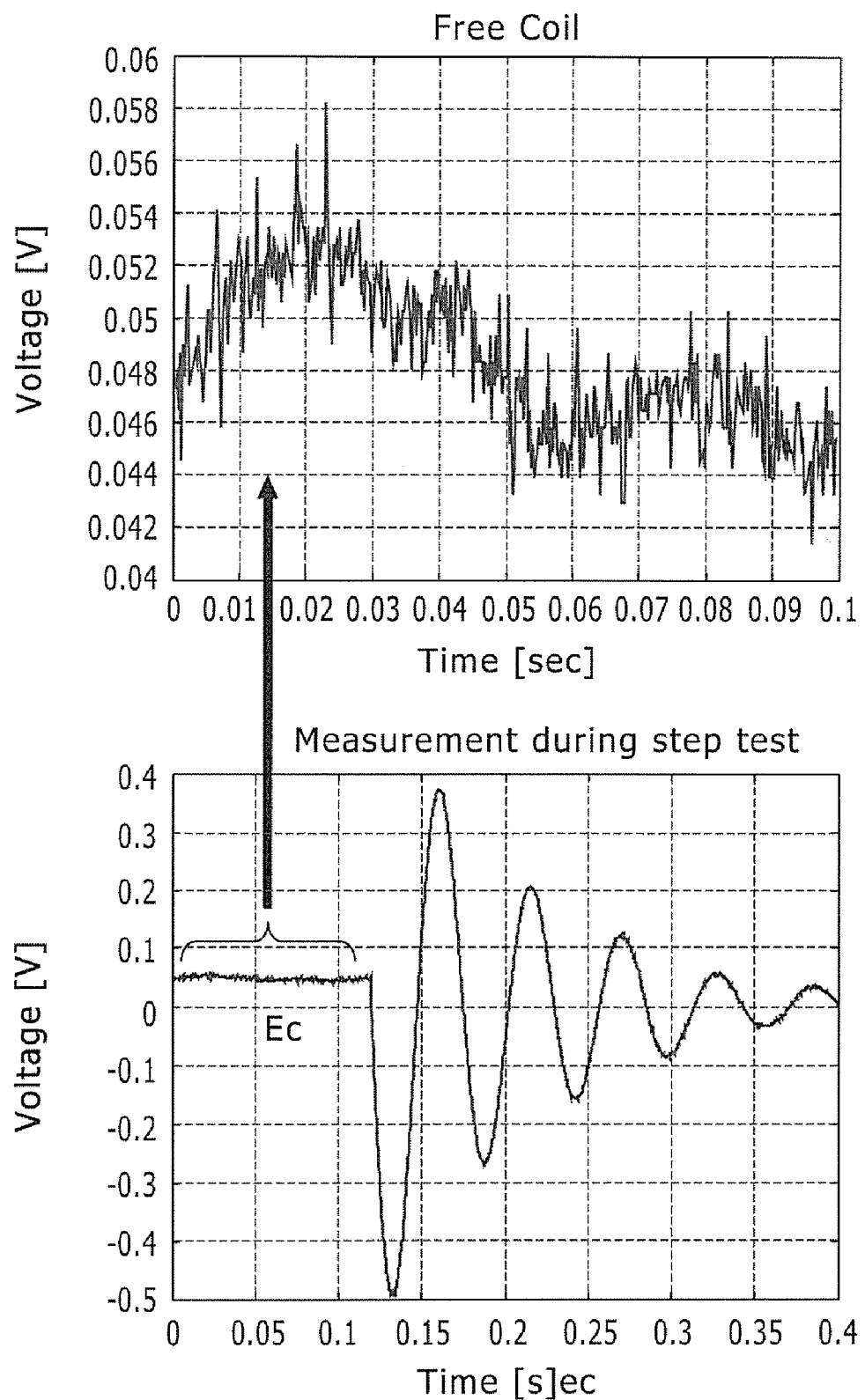
FIG. 3 depicts noise that is prevalent in conventional DCR measurement techniques during step test.

FIG. 3 shows moving coil voltage after the coil motion due to current injection has settled, i.e., the coil is also responding to environmental noise. Let s be the signal that is measured. The coil voltage is an average of signal s. The signal contains noise that deteriorates or degrades the determination of coil voltage. From the measured signal s, the coil voltage $E_c$ and noise voltage $E_n$ may be calculated as follows:

$$E_c = \text{Average}(s) = 0.0484 \text{ V}$$

$$E_n = rms(s-E_c) = 0.0029 \text{ V}$$

The signal-to-noise ratio, SNR, is then calculated as:

$$\text{SNR} = 20 \cdot \log(E_c/E_n) = 24 \text{ dB}.$$

As evident from the above data, the SNR indicates that there is excessive noise in the measured signal that is caused in part due to environmental noise. In addition to degradation in DCR measurements due to environmental noise, the applicant noted that the response parameters of a seismic sensor are functions of the operating temperature. The DCR is also temperature dependent. Therefore, the present disclosure includes techniques that compensate for heat that might be generated due to the current that is injected to lock the moving coil. Since such heat generation could influence the DCR, it is desirable that generated heat be compensated based on the desired accuracy in DCR measurements.

Figure 4:
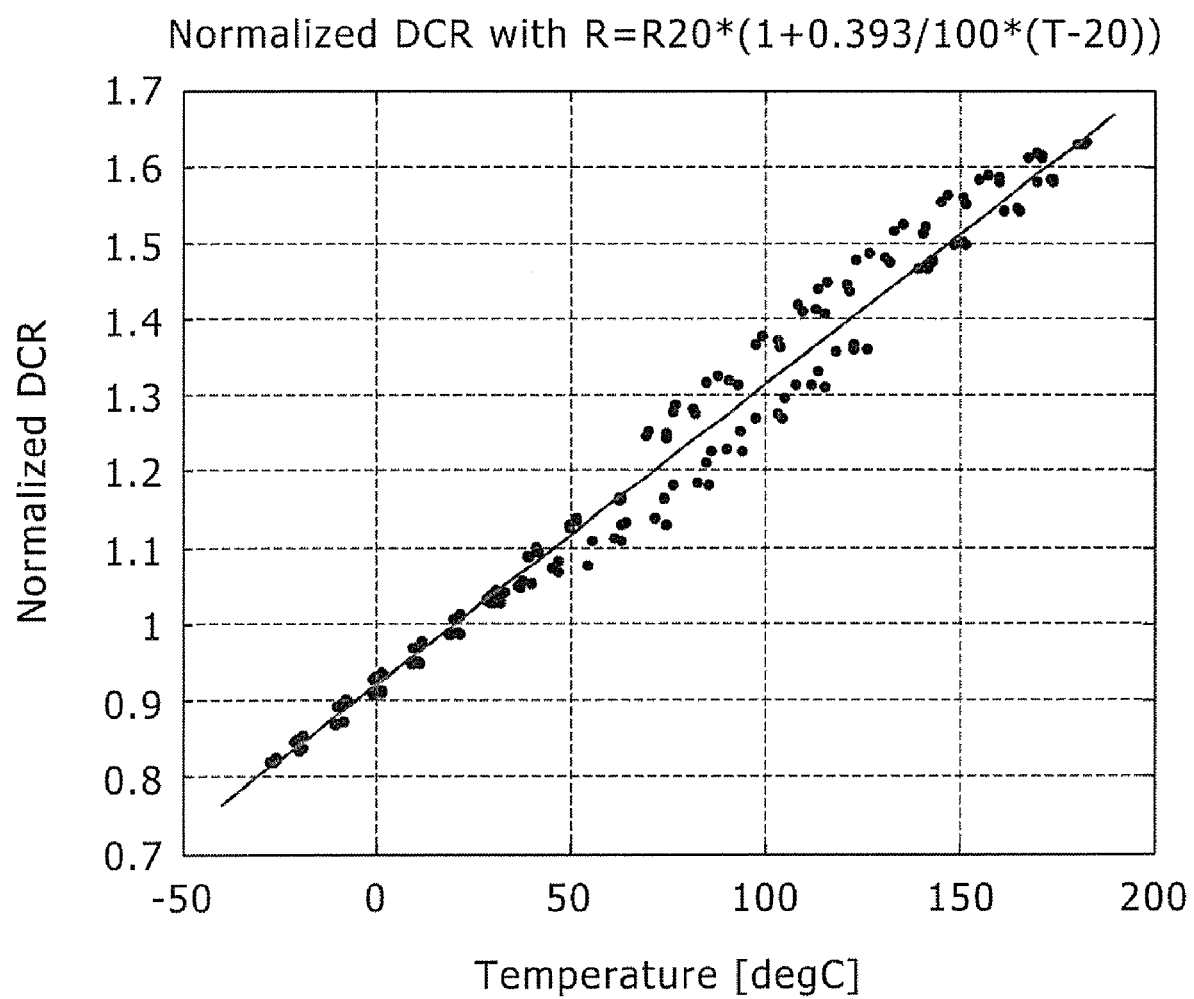
FIG. 4 is a graph depicting geophone coil DCR measurements as a function of temperature.

FIG. 4 shows measured geophone DCR as a function of temperature. A temperature gauge was attached to the geophone housing and DCR was measured while the geophone was kept in an oven at a constant temperature. The temperature in the oven was changed from room temperature to higher temperatures, and then cooled down. The process was repeated twice. For each measurement, the resistance was measured after the temperature became stable. There is some hysteresis in the rising temperature and cooling down cycles. This is because the geophone coil does not respond to the housing temperature quickly. The discrepancy may be reduced if the geophone is kept in the oven for a long time at a constant temperature. The solid line in FIG. 4 is the resistance of the magnet wire simulated by using temperature coefficient 0.00393 degrees Celsius as defined by an industrial standard.

The resistance of a piece of magnet wire is expressed as:

$$r(T) = r(20)\{1 + 0.00393(T-20)\} \quad \text{Equation 1}$$

By knowing the resistance at 20 degrees Celsius, and measuring the resistance at the temperature at which geophones are used, the temperature of the wire may be found as:

$$T = \frac{1}{0.00393}\left\{\frac{r(T)}{r(20)} - 1\right\} + 20 \quad \text{Equation 2}$$

It is noted that the response of a geophone is related to its temperature. FIG. 5 shows a comparison of the geophone response parameters, natural frequency $f_0$, open circuit damping $D_0$ and open circuit sensitivity $S_0$, as functions of temperature. The left plot shows the geophone parameter results plotted against the housing temperature and the right plot shows the geophone parameter results plotted against temperature calculated from the coil. As evident from FIG. 5, the temperature derived from the coil show better consistency with the geophone parameters than the temperature derived from the geophone housing. This indicates that the temperature of the coil represents the geophone response more than the housing temperature does. From the right plot, the responses are determined as functions of temperature as:

$$f_0(T) = f_0(20) \times (1.361 \times 10^{-7}\Delta T^2 - 9.627 \times 10^{-5}\Delta T + 1)$$

$$D_0(T) = D_0(20) \times (3.395 \times 10^{-2}\Delta T^2 - 2.467 \times 10^{-3}\Delta T + 1)$$

$$S_0(T) = S_0(20) \times (-4.921 \times 10^{-7}\Delta T^2 - 3.116 \times 10^{-4}\Delta T + 1)$$

where $\Delta T = T - 20$ in degrees Celsius.

Thus, the geophone response parameters can be estimated from the temperature determined by the DCR of the coil.

In order to address the types of shortcomings described above, the applicant has proposed novel and efficient techniques for reducing or eliminating degradation in seismic sensor calibration. In one aspect of the present disclosure, a predetermined voltage is applied to the seismic sensor so that the moving coil of the sensor is pushed to the bottom or the top of the sensor housing, as depicted in the exemplary embodiment in FIG. 6. As evident from FIG. 6, the moving coil is pressed against the bottom of the housing so as to be locked thereto and impervious to environmental noise.

In the techniques of FIG. 6, if the injected current is large, the current induces heat, i.e., self-heating effects, and the temperature of the moving coil increases. If the current that is injected to the moving coil is too large, then the coil may be burnt. Therefore, it is desirable to optimize the amount of the injected current so that the moving coil is pushed to the top or the bottom of the sensor housing, and by being locked thereto becomes insensitive to environmental noise, but the temperature of the coil is not adversely influenced.

The force induced by the current is $S_0$ times I and is in balance with the spring force induced by the displacement of the coil and gravity acting to the moving mass (for a geophone placed vertical), m. For a geophone having a spring that is not prestressed, and is positioned vertically, $$kx \pm mg = S_0 I \quad \text{Equation 3}$$

where "+" sign indicates lifting the coil to the top of the housing against gravitational acceleration, g.

Since the natural angular frequency of the mass and spring system is:

$$\frac{k}{m} = \omega_0^2 \qquad \text{Equation 4}$$

the voltage needed to displace the moving mass to either top or bottom of the movable space is then:

$$E_c = \frac{mr}{S_0}(x_0\omega_0^2 \pm g) \qquad \text{Equation 5}$$

where $x_0$ is the distance from the central position to the maximum position and the "+" sign is to lift the coil to the top of the housing. For a geophone located horizontally, or a vertical geophone with a pre-stressed spring, the gravity term is dropped.

Assuming the following parameters for a geophone:

$F_0$=18 Hz;

$S_0$=78 V/(m/s);

m=3.14 gm;

r=1500 ohm; and $x_0$=1.5 mm.

The voltage required to lift the moving coil to the top position is 1.75V. Since the electric power is $P=I^2r$, 2 mW is dissipated as heat.

The specific heat c of a copper coil is 380 J/(kg ° C.). If 1.75V is applied to the coil for t=1 second, the coil temperature increases by:

$$\Delta T = \frac{Pt}{mc} \qquad \text{Equation 6}$$
$$= \frac{0.002(W) \times 1(s)}{0.00314(\text{kg}) \times 380(J/(\text{kg} \cdot {}^\circ K.))}$$
$$= 0.002^\circ K.$$

This is very small and may not interfere with the DCR measurements as long as the measurement time is kept short.

The present disclosure envisions applying an appropriate voltage so that the moving coil is not heated, but the voltage is sufficiently high to displace the moving coil to the maximum locked position. The practical voltage may be twice as much as the minimum voltage obtained by Equation 5 so as to make sure that the coil is pushed to the limit and will not respond to environmental vibrations. The predetermined voltage may be set depending on the tolerance of the geophone parameters and amount of the environmental noise.

Figure 7:
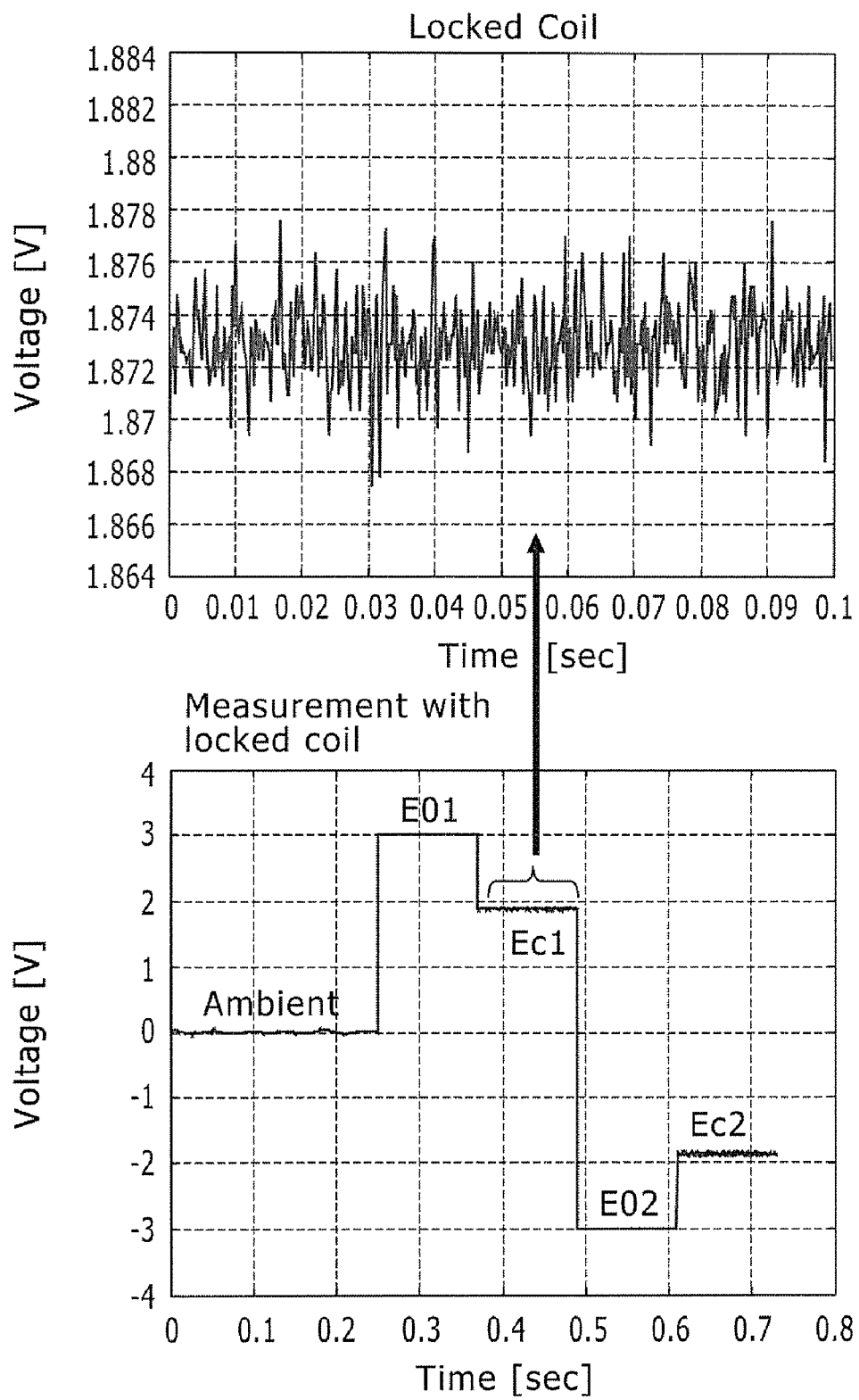
FIG. 7 shows improved noise results in one possible DCR measurement as proposed herein.

FIG. 7 depicts a case in which there is no environmental noise by locking the coil at the cap and only electric noise is observed. In this measurement $E_c$=Average(s)=1.8729 V $E_n$=rms(s-$E_c$)=0.0016 V SNR=20*log($E_c/E_n$)=56 dB The above SNR=56 dB compares well with the SNR=24 dB that resulted without locking the moving coil, as previously described above. As evident, the signal-to-noise ratio is improved by 32 dB.

In this example, the polarity of the supply voltage was also flipped to see if there is a Peltier effect and a DC offset or DC drift in the measurement system. A seismic sensor has electrical contacts of different metals. Also, a geophone is wired to electronics and the connecting wires are soldered to pins with a different metal on a printed circuit board. The temperatures of the various contacts are not necessarily the same and there are finite temperature differences. Under such variations in the metal contacts and temperature there may be various Peltier effects that cause additional voltage in the measurements. Moreover, the electronics may have DC drifts to a certain degree. Such Peltier effects and DC drifts and offsets cause finite errors in the DCR measurements.

Figure 8A:
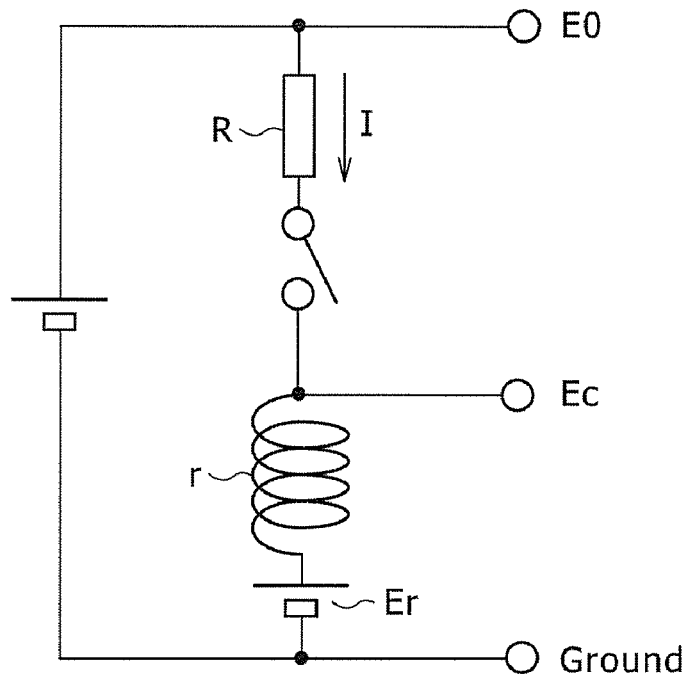
FIG. 8A is a circuit diagram showing a Peltier effect in a geophone modeled as a battery connected to the moving coil and FIG. 8B is another circuit diagram representing Peltier effect at the instrument connection, DC drift and DC offset in an electric circuit of the instrument.
Figure 8B:
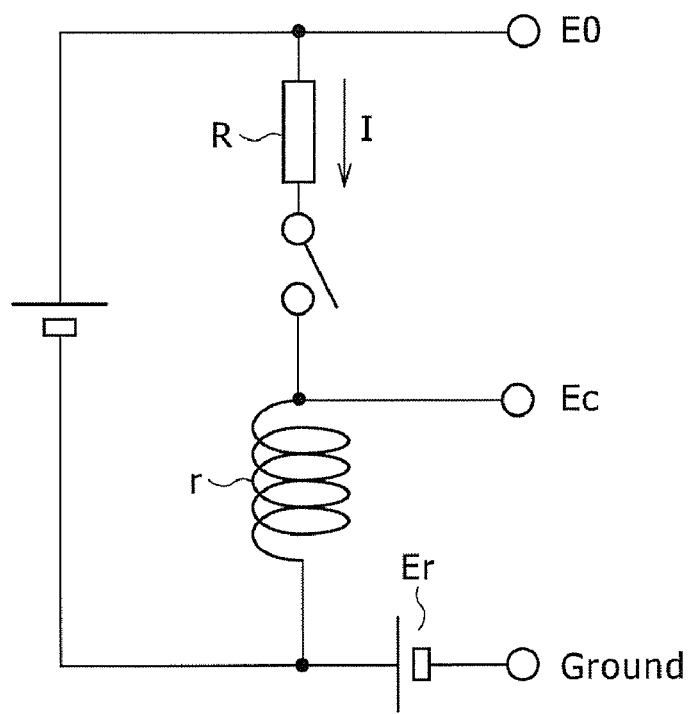

The Peltier effects in a geophone may be modeled as a battery connected to the coil, as shown in FIG. 8A. The circuit of FIG. 8B may also represent Peltier effects outside of the geophone, and DC drift and DC offset in the measurement circuits. In either case, voltage error, $E_r$, may be expressed as:

$$E_c = Ir + E_r \qquad \text{Equation 7}$$

The Peltier effect error and DC drift or offset error may be cancelled by applying two different currents, such as flipping the polarity of the injected current.

As previously discussed above, in general, the DC error may be cancelled by applying different amounts of current, $I_1$ and $I_2$:

$$E_{c1} = I_1 r + E_r \qquad \text{Equation 8}$$
$$E_{c2} = I_2 r + E_r \qquad \text{Equation 9}$$

Subtracting Equation 8 from Equation 9 yields:

$$r = \frac{E_{c2} - E_{c1}}{I_2 - I_1} \qquad \text{Equation 10}$$

The current may be determined by measuring $E_0$ and $E_c$, then $$I_1 = \frac{E_{01} - E_{c1}}{R} \qquad \text{Equation 11}$$

$$I_2 = \frac{E_{02} - E_{c2}}{R} \qquad \text{Equation 12}$$

By using Equations 11 and 12, Equation 10 may be rewritten as:

$$r = \frac{R}{\frac{E_{02} - E_{01}}{E_{c2} - E_{c1}} - 1} \qquad \text{Equation 13}$$

Flipping polarity is a special case of changing voltage and Equation 13 is applicable to any case in which the voltage is changed.

In the previous discussion it was suggested that the heat due to current injection may be small. However, if it is desirable to compensate for heat in cases such as when the measurement time needs to be long and/or if a large amount of current needs to be injected to levitate a moving coil having a large mass, the compensation may be performed as described hereinafter.

Figure 10A:
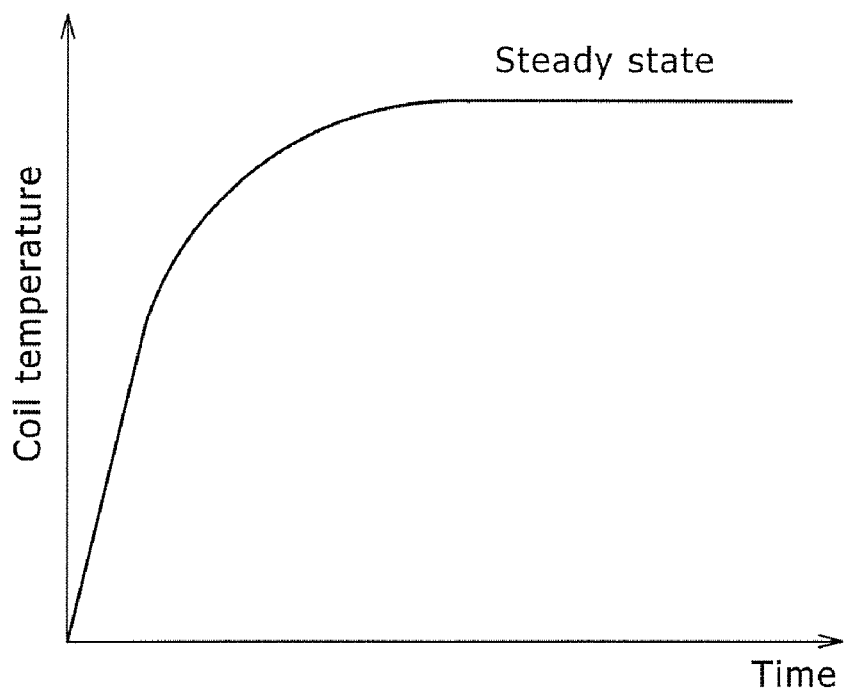
FIG. 10A is a graph illustrating temperature changes in a seismic sensor moving coil due to current injection over time.

FIG. 9 shows heat dissipation by current injection and heat convection from the coil to ambient temperature. The temperature increases linearly in time as the heat is accumulated in the moving coil. The heat is then conducted to other materials of the moving coil, to the air, to the pole piece, magnet, and eventually to the housing of the geophone. Once conduction reaches the housing, the housing temperature rises and convection effects start in the air near the geophone so that in time the housing temperature reaches a steady state. If the temperature gradient is large, convection may occur in the air in the geophone; however, such a result is not likely in the small gap that is typically present in the sensor housing, for example, in the order of 0.1 mm. FIG. 10A illustrates the above temperature changes of the coil.

From Equation 6, the increase of temperature in early stage is estimated by the power, P (current times voltage) applied to the coil as:

$$T - T_0 = \frac{P}{mc} t \qquad \text{Equation 14}$$

The DCR of the coil also changes according to the temperature change.

$$r = r_0\{1 + \alpha(T - T_0)\} \qquad \text{Equation 15}$$

where $\alpha$ is the temperature coefficient of the magnet wire and is equal to 0.00393 for copper.

Figure 10B:
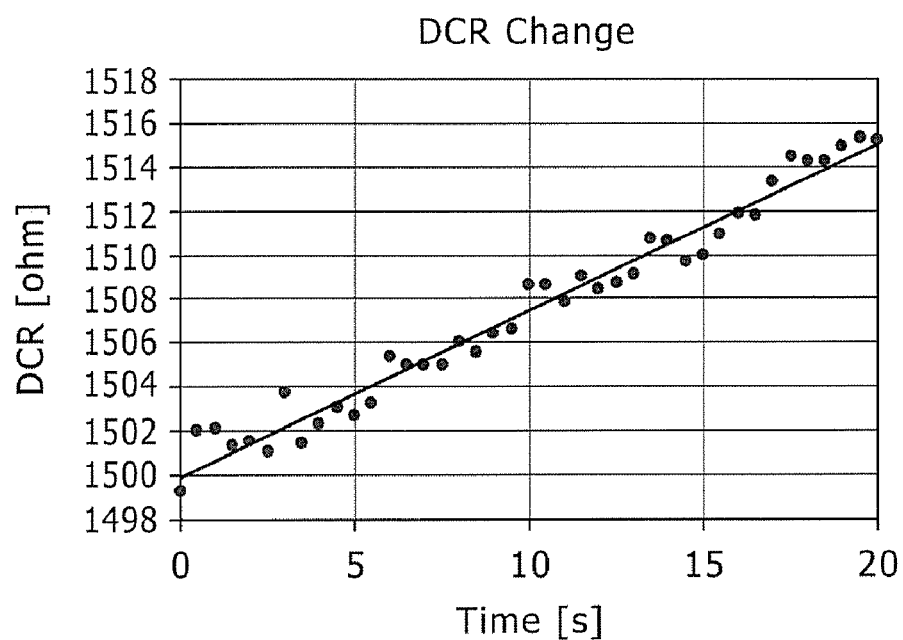
FIG. 10B is a graph showing simulated results of early stage changes in DCR due to heat generation.

FIG. 10B shows simulated results of early stages of DCR changes. It may be assumed that the temperature increase is small, and conduction and convection heat transfer have not yet started. Geophone parameters are assumed as:

$f_0$=20 Hz;

$S_0$=25 V/(m/s);

m=20 gm;

r=1500 ohm; and $x_0$=2 mm.

The spring does not have pre-stress and the geophone is vertically positioned. The moving coil is locked at the top of the geophone. Random numbers are added to represent noise. The voltage across the coil is recorded continuously for 20 seconds after the current is injected, and the DCR is calculated from applied voltage $E_0$ and the coil voltage Ec.

The resistance at the initial temperature, $T_0$, is found as follows. First, a geophone is exposed to a constant temperature and a steady state is established. The initial temperature $T_0$ is measured by placing a temperature sensor on a geophone housing without injecting current so that the housing temperature represents the initial moving coil temperature. Then, the necessary current is injected and DCR continuously recorded as shown in FIG. 10B. The DCR at $T_0$ is evaluated at t=0 by interpolating the DCR time record.

Figure 11A:
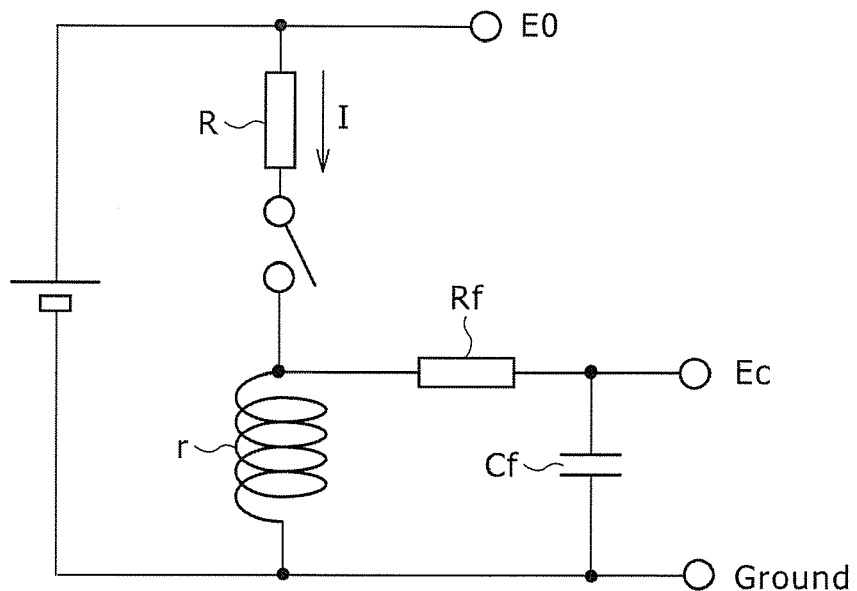
FIG. 11A depicts one exemplary known filtering technique.

FIGS. 11A-11D depict techniques for suppressing electrical noise according to the present disclosure. As previously discussed above, environmental noise may be suppressed or controlled by applying a current to a moving coil of a seismic sensor to lock the moving coil. However, in addition to the noise previously discussed there is prevalent electrical noise in the signals $E_0$ and Ec. Note FIG. 11A. One way to suppress electrical noise is to apply a low pass filter as shown in FIG. 11A. The noise can be 50 Hz or 60 Hz mains noise. To remove such electrical noise, the low pass filter's cut off frequency may be set at, for example, 5 Hz.

Figure 11B:
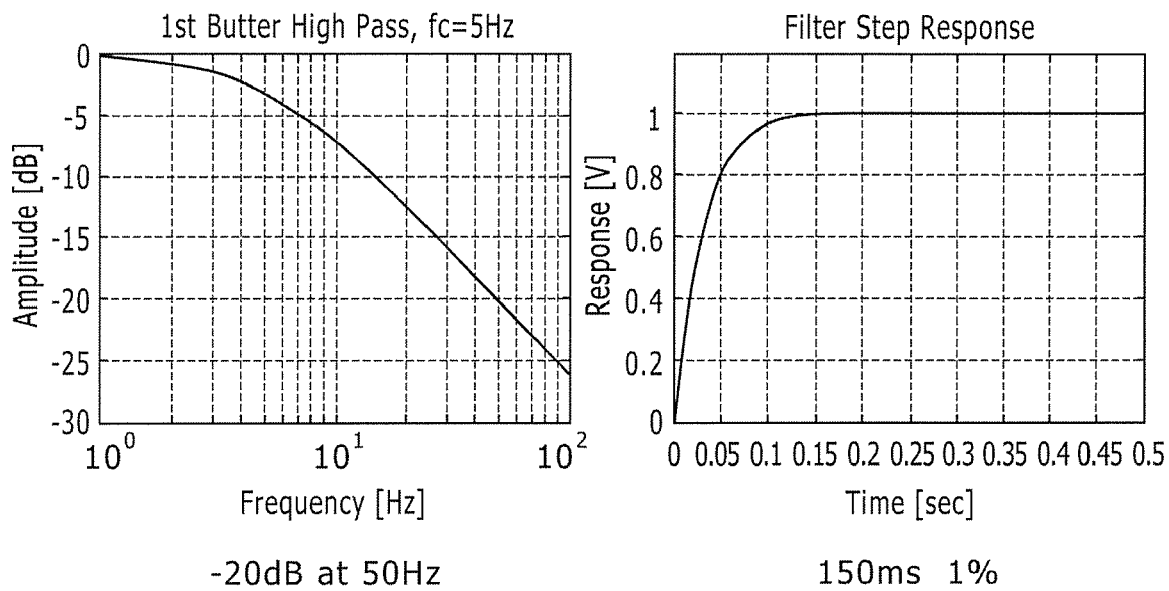
FIG. 11B depicts the frequency response (left) and time response (right) of the filtering technique in FIG. 11A.

The left-hand side graph in FIG. 11B shows a first order filter response of the circuit that is shown in FIG. 11A. The filter attenuates 50 Hz by 20 dB. The step response of the filter is shown in the right-hand side graph of FIG. 11B. It takes about 150 ms till the voltage settles within a 1% error. However, it is noted that applying a filter causes errors in the voltage measurements, and it is necessary to wait till the measurement errors become small. In this, the required waiting time depends on the accuracy of the measurements.

Figure 11C:
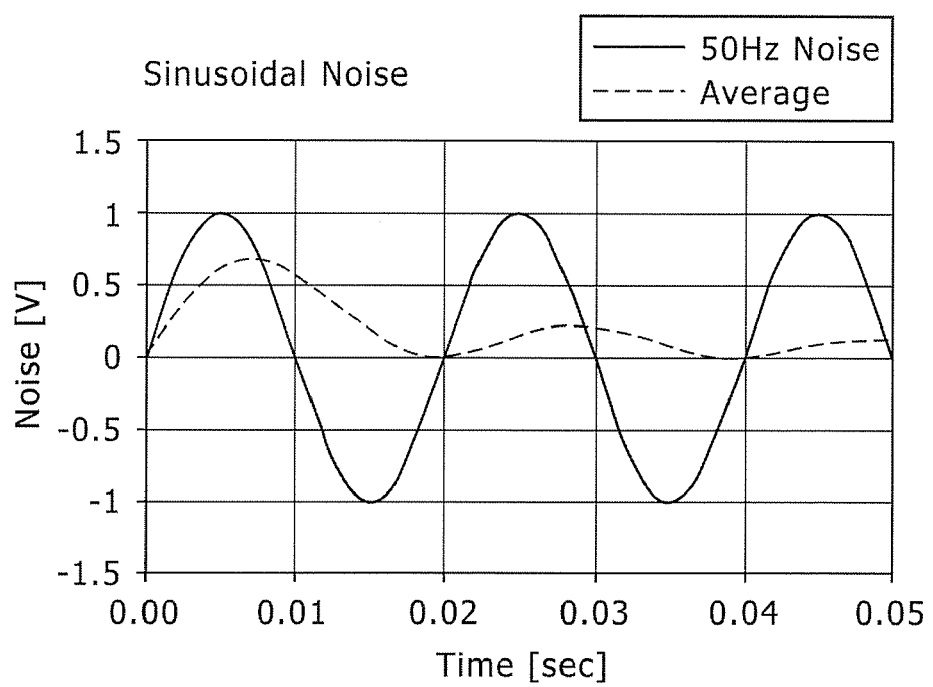
FIG. 11C shows the effects of an averaging technique according to the present disclosure.
Figure 11D:
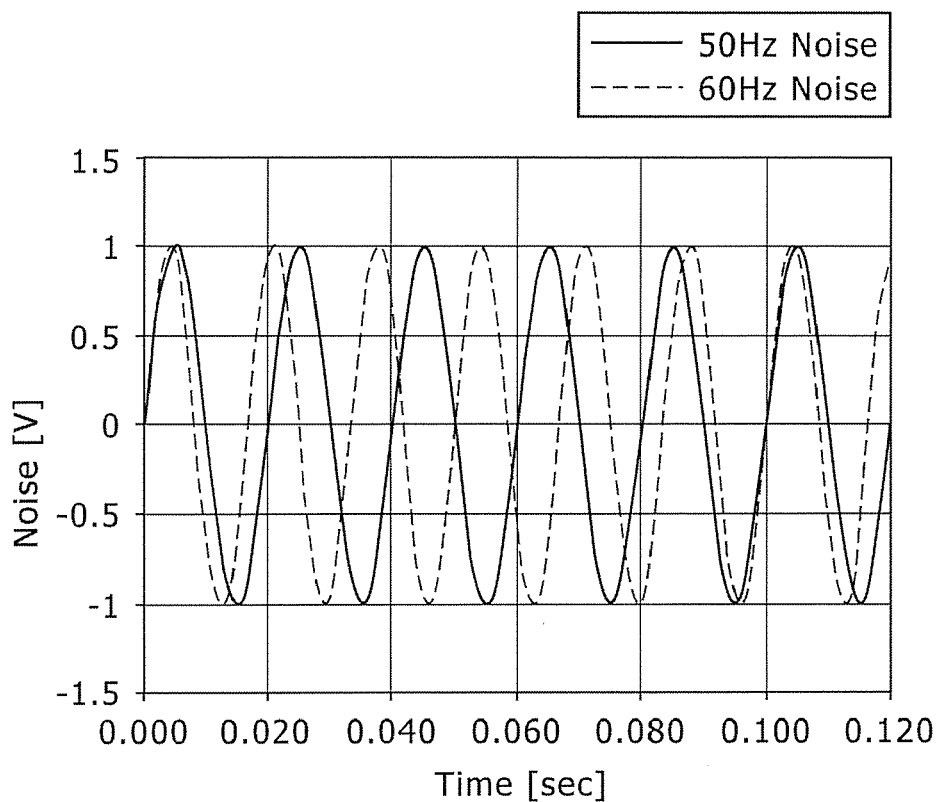
FIG. 11D shows the noise reduction for both 50 Hz and 60 Hz noises in accordance with one embodiment of the present disclosure.

Since 50 Hz or 60 Hz electrical mains noise is sinusoidal, such electrical noise may also be removed by averaging the data over a cycle or over "n" cycles of the noise frequency, where "n" is an integer number. In this, it is noted that the average of sinusoidal noise over an exact cycle is zero. FIG. 11C shows averaging of a sinusoidal wave. The solid curve in FIG. 11C is 50 Hz noise and the dotted curve is the average from time zero. It is seen that averaging becomes zero when time passes every cycle. For 50 Hz noise, the minimum length of averaging is only 20 ms.

It is also noted that the frequency of AC power supply can be 50 Hz or 60 Hz depending on the location. It is possible to use Least Common Multiple of 50 Hz and 60 Hz, i.e., 100 ms. As long as the averaging is over 100 ms, or any multiples of 100 ms, the result does not have any effects of 50 Hz or 60 Hz electrical noise. Note FIG. 11D.

FIG. 12 depicts one possible operational context for the principles discussed in the present disclosure. FIG. 12 shows a land seismic operation in which vibrator 206 generates seismic signals that penetrate into the earth and are reflected back to the surface from underground structures. The vibrator 206 generates continuous signals and seismic data are acquired continuously by geophones 202 and equipment 214. Most of the seismic energy, however, does not go into the earth and a major part of the energy propagates on the surface as surface waves. This is known as ground roll, and it is a major part of the surface noise.

In a land seismic operation, a new acquisition area is established by moving the geophones and associated equipment from the area where the acquisition is finished to a new area. During building the new acquisition area, the geophones and instruments have to be tested before starting seismic data acquisition in the new area. The geophones and instruments are carried using trucks, and often the geophones are calibrated in a noisy environment with nearby ground roll and trucks that degrade or deteriorate the calibration measurements. The principles of the present disclosure, for example, as represented in the exemplary context of FIG. 12, provide novel and effective mechanisms for addressing such needs and requirements in oilfield seismic surveying.

FIG. 13 depicts one embodiment of a system for determining DCR according to the principles of the present disclosure. As shown in FIG. 13, a geophone is connected to the system. Inputs of nominal geophone parameters, such as $f_0$, $D_0$, $S_0$, r and m are provided to the system. The digital signal processor (DSP) or processor (CPU) calculates the optimum voltage, as previously described above, that is sufficient to lock the moving coil of the geophone after taking into account any errors in the input parameters, and adjusts the supply voltage $E_0$. The DSP activates $S_1$ and waits. The DSP flips $S_2$ and the analog-to-digital converter (ADC) samples $E_0$ and $E_c$ then the DSP reads the $E_0$ and $E_c$ data, and calculates the DCR. The DSP may sample $E_0$ and $E_c$ twice by changing $E_0$ to remove Peltier effects, DC offset and/or DC drift. Although the DSP knows $E_0$, since it sets the voltage; however, it is better to measure $E_0$ in case there is any discrepancy between the setting and the actual voltage that is applied.

FIGS. 14A-14C are flowcharts of some possible methods for calibrating seismic sensors according to the present disclosure.

Referring to FIG. 14A, a seismic sensor of the type described herein is placed for DCR measurement (Step 100). A first current is applied to lock the moving coil of the seismic sensor (Step 102) and a first voltage across the moving coil and a first current injected into the moving coil are measured (Step 104). DCR of the moving coil is determined according to the techniques described herein (Step 106).

In another possible embodiment, the technique of FIG. 14B further includes applying a second current to lock the moving coil of the seismic sensor (Step 108) and measuring a second voltage across the moving coil and a second current running into the moving coil (Step 110).

In the embodiment of FIG. 14C, background noise is measured and DC is applied to lock the moving coil of a seismic sensor to one end of the sensor housing. Reference and coil voltages are measured and SNR is calculated. A different DC is applied to lock the moving coil of the seismic sensor to the other end of the sensor housing, reference and coil voltages are measured, and SNR is calculated. DCR is determined by cancelling Peltier effects and DC offset, as previously described herein. Reduction in noise may be calculated, and the temperature may be derived from the DCR.

Generally, the techniques disclosed herein may be implemented on hardware and/or hardware and software. For example, they can be implemented in an operating system kernel, in a separate user process, in a library package bound into telemetry and/or network applications, on a specially constructed machine, or on a network interface card. In one embodiment, the techniques disclosed herein may be implemented, in part, using software such as an operating system or in an application running on an operating system.

A hardware or hardware/software hybrid implementation of the present techniques may be implemented on a general-purpose programmable machine selectively activated or reconfigured by a computer program stored in memory. Such a programmable machine may be implemented on a general-purpose network host machine such as a personal computer or workstation. Further, the techniques disclosed herein may be at least partially implemented on a card (e.g., an interface card) for a network device or a general-purpose computing device.

The embodiments and aspects were chosen and described in order to best explain the principles of the invention and its practical applications. The preceding description is intended to enable others skilled in the art to best utilize the principles described herein in various embodiments and with various modifications as are suited to the particular use contemplated. It is intended that the scope of the invention be defined by the following claims.

What is claimed is:

1. A method of calibrating a seismic sensor, comprising:
   injecting a current into a moving coil of the seismic sensor;
   measuring a voltage across the moving coil;
   locking the coil such that environmental noise is reduced while measuring the moving coil voltage; and
   determining DC resistance (DCR) of the moving coil, wherein
   DCR of the moving coil is determined by:

$$r = \frac{R}{\frac{E_{02} - E_{01}}{E_{c2} - E_{c1}} - 1},$$

where r is the DCR of the moving coil;
   R is the series resistance; and
   $E_{01}$ and $E_{02}$ are supply voltage and $E_{c1}$ and $E_{c2}$ are moving coil voltage at different amounts of current, $I_1$ and $I_2$, respectively.

2. A method according to claim 1, further comprising:
   compensating for heat generated by the current injected into the moving coil of the seismic sensor.

3. A method according to claim 2, wherein
   compensating for heat generated by the injected current comprises continuously monitoring changes in DCR over time.

4. A method according to claim 1, further comprising:
   injecting a second, different current into the moving coil of the seismic sensor;
   measuring a second voltage across the moving coil; and
   determining DCR of the moving coil.

5. A method according to claim 1, further comprising:
   cancelling one or more of Peltier effects, DC offset, and DC drift by injecting different currents to the moving coil of the seismic sensor.

6. A method according to claim 1, further comprising:
   flipping polarity of the current and injecting the current having flipped polarity into the moving coil of the seismic sensor.

7. A method of measuring DC resistance (DCR) of a seismic sensor, comprising:
   injecting a first current into a moving coil of the seismic sensor;
   measuring a first voltage across the moving coil;
   injecting a second current into the moving coil, wherein the second current is different from the first current;
   measuring a second voltage across the moving coil;
   immobilizing the moving coil such that environmental noise is reduced while measuring the first and second moving coil voltages; and
   determining DCR of the moving coil based on the first voltage and the second voltage across the moving coil, wherein
   DCR of the moving coil is determined by:

$$r = \frac{R}{\frac{E_{02} - E_{01}}{E_{c2} - E_{c1}} - 1},$$

where r is the DCR of the moving coil;
   R is the series resistance; and
   $E_{01}$ and $E_{02}$ are supply voltages and $E_{c1}$ and $E_{c2}$ are the first and second voltages across the moving coil at the first and second currents, respectively.

8. A system for calibrating a seismic sensor, comprising:
   an electrical source for applying a voltage across a moving coil of a seismic sensor, the moving coil being selectively lockable;

a measurement device for measuring a voltage across the moving coil;

a digital signal processor in communication with the seismic sensor; and a set of instructions executable by the processor that, when executed:

applies the voltage to the seismic sensor and determines if the moving coil has been locked, wherein the system is configured or designed to reduce environmental noise while measuring the moving coil voltage.

9. A system according to claim 8, further comprising:

an interface communicably coupled to the measurement device for displaying the voltage across the coil after the coil has been locked.

10. A method of calibrating a seismic sensor, comprising:

injecting a current into a selectively lockable moving coil of the seismic sensor;

temporarily locking said moving coil to suppress environmental noise;

measuring a voltage across said moving coil; and suppressing electrical mains noise in the measured voltage data by averaging the measured data over cycles of the noise frequency.

11. A method according to claim 10, wherein the measured data are averaged over n cycles of the noise frequency, where n is an integer number.

12. A method according to claim 10, wherein the electrical mains noise comprises 50 Hz or 60 Hz electrical mains noise; and the measured data is averaged over 100 ms cycles, or any multiples of 100 ms.

\* \* \* \* \*